(12) United States Patent
Cho et al.

(10) Patent No.: US 7,974,518 B2
(45) Date of Patent: Jul. 5, 2011

(54) RECORD REPRODUCING DEVICE, SIMULTANEOUS RECORD REPRODUCTION CONTROL METHOD AND SIMULTANEOUS RECORD REPRODUCTION CONTROL PROGRAM

(75) Inventors: Shisei Cho, Saitama (JP); Katsumi Amano, Saitama (JP)

(73) Assignee: Pioneer Corporation, Tokyo (JP)

( * ) Notice: Subject to any disclaimer, the term of this patent is extended or adjusted under 35 U.S.C. 154(b) by 1266 days.

(21) Appl. No.: 11/587,343

(22) PCT Filed: Apr. 18, 2005

(86) PCT No.: PCT/JP2005/007414
§ 371 (c)(1),
(2), (4) Date: Nov. 16, 2006

(87) PCT Pub. No.: WO2005/104125
PCT Pub. Date: Nov. 3, 2005

(65) Prior Publication Data
US 2007/0160348 A1 Jul. 12, 2007

(30) Foreign Application Priority Data
Apr. 26, 2004 (JP) ................................ 2004-130263

(51) Int. Cl.
*H04N 9/80* (2006.01)
(52) U.S. Cl. .................... 386/248; 386/328; 375/240.01

(58) Field of Classification Search .................... 386/46, 386/83, 95, 124–126, 239, 248, 326, 328; 375/240.01–240.03
See application file for complete search history.

(56) References Cited

U.S. PATENT DOCUMENTS

2002/0181931 A1* 12/2002 Nishijima et al. .............. 386/46
2004/0008767 A1   1/2004 Ueda et al.

FOREIGN PATENT DOCUMENTS

| JP | 2000-322828 A | 11/2000 |
| JP | 2003-022604 A | 1/2003 |
| JP | 2003-523040 A | 7/2003 |
| JP | 2003-308643 A | 10/2003 |
| JP | 2004-048138 A | 2/2004 |
| WO | WO 01/35646 A1 | 5/2001 |
| WO | WO 01/59784 A1 | 8/2001 |

* cited by examiner

*Primary Examiner* — Thai Tran
*Assistant Examiner* — Mishawn Dunn
(74) *Attorney, Agent, or Firm* — Foley & Lardner LLP

(57) ABSTRACT

A record/play device includes a recording unit that records, on a recording medium, a series content data sequentially input to the record/play device, a playback unit that plays back, while recording the data by the recording unit, the content data recorded on the recording medium, and a control unit that controls simultaneous record and play. The control unit includes a data size changing unit that changes a data size at which the content data is to be recorded on the recording medium to a data size different from a data size at which content data that has been recorded on the recording medium is recorded.

8 Claims, 5 Drawing Sheets

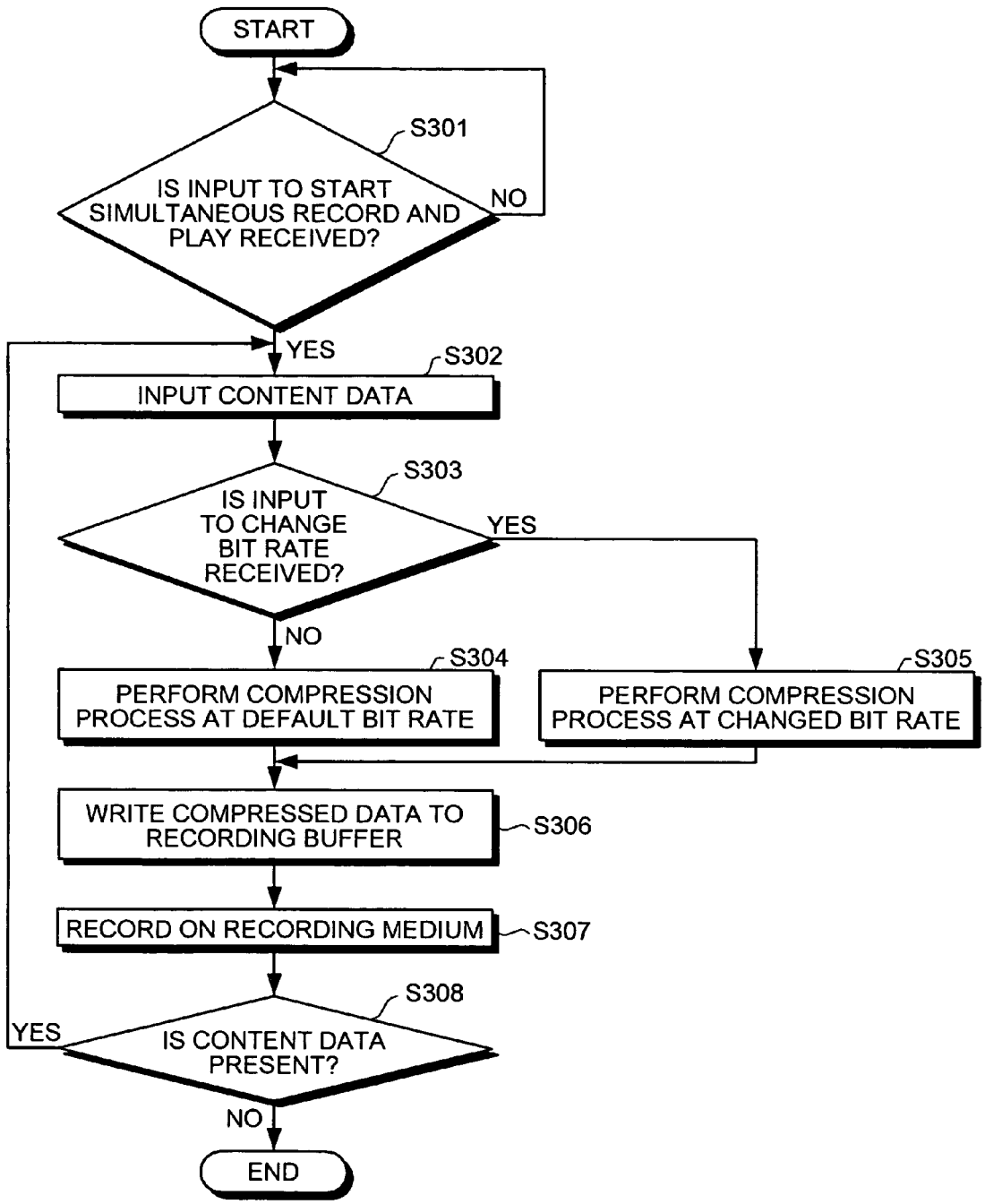

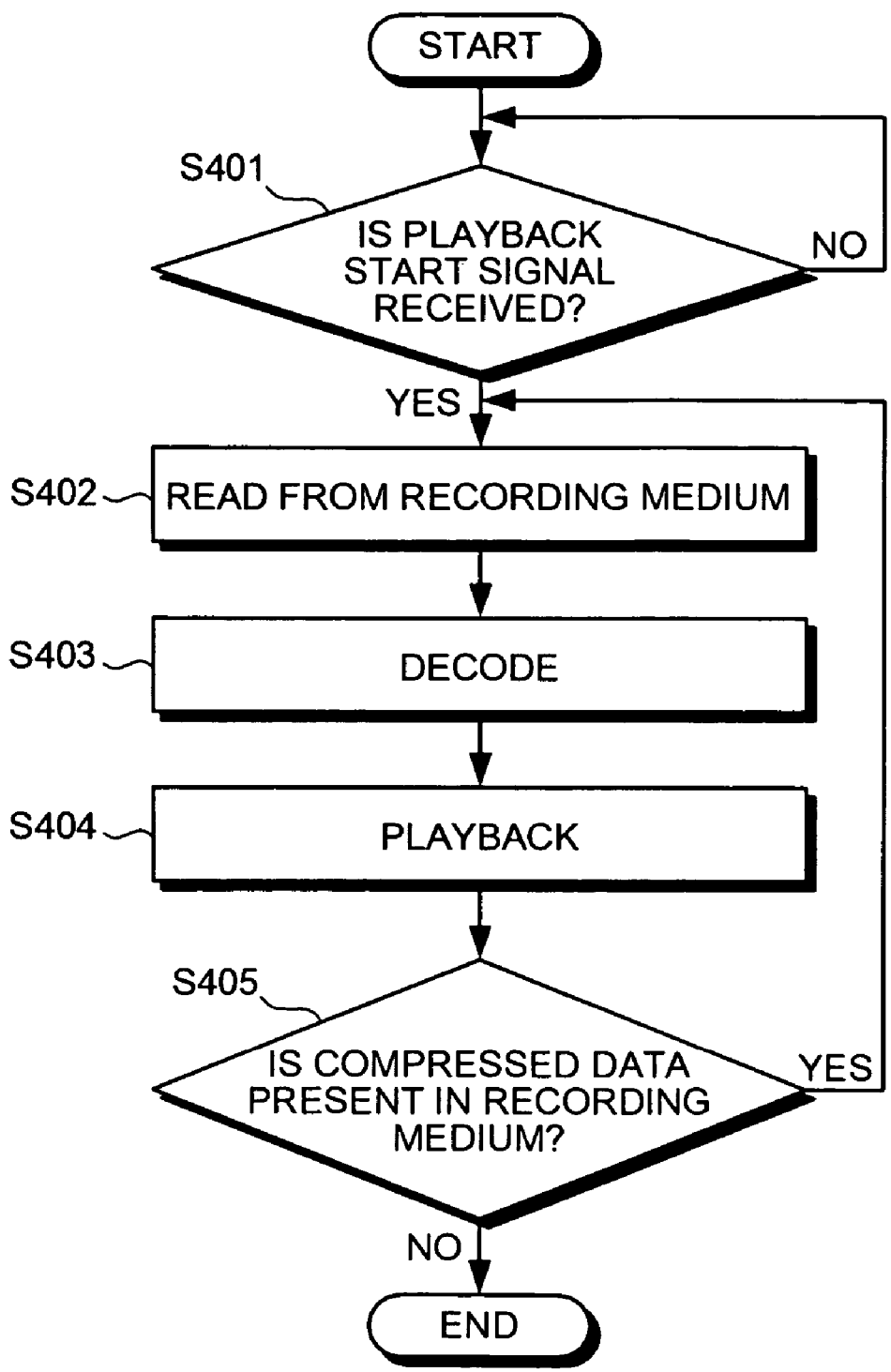

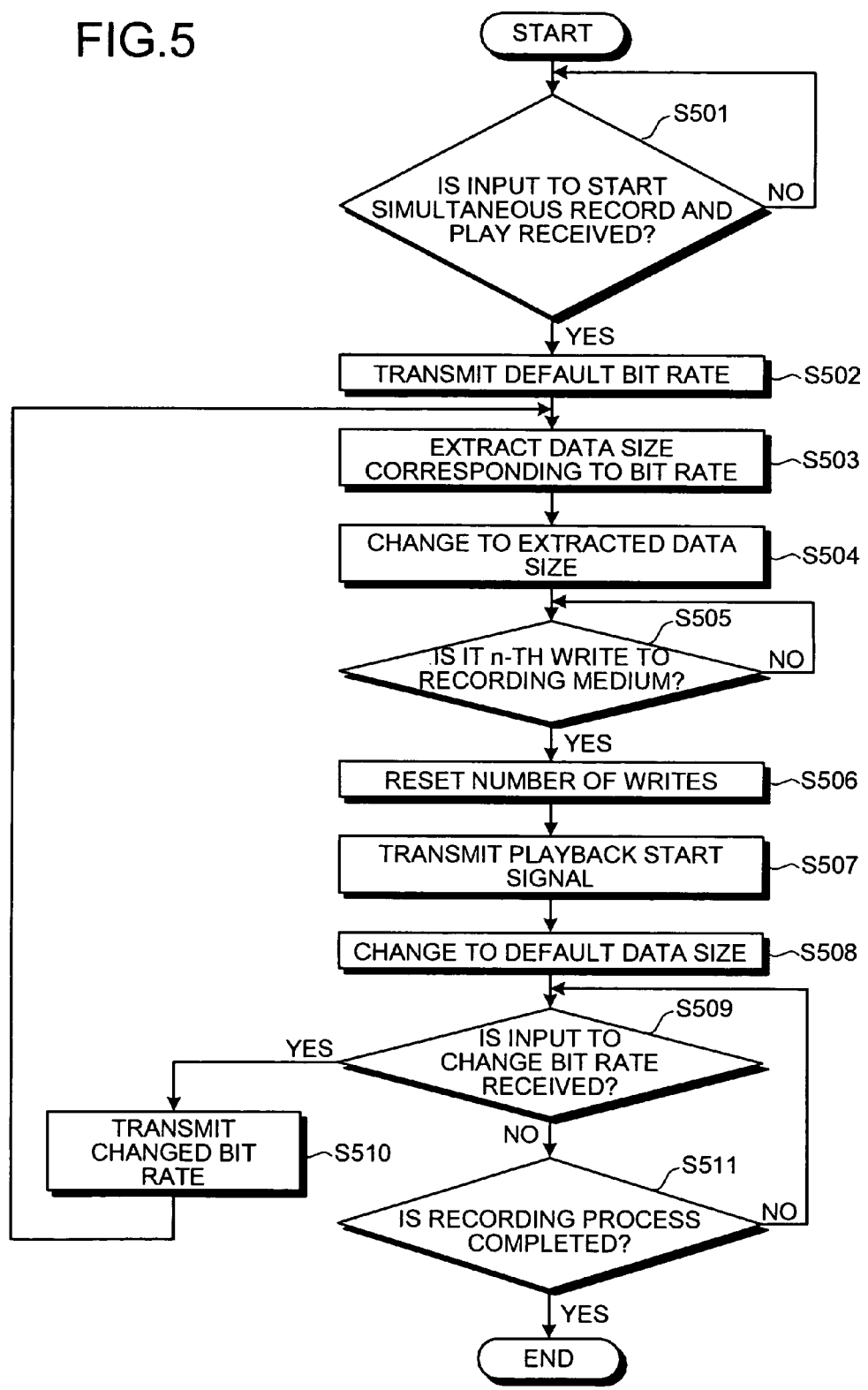

RECORD REPRODUCING DEVICE, SIMULTANEOUS RECORD REPRODUCTION CONTROL METHOD AND SIMULTANEOUS RECORD REPRODUCTION CONTROL PROGRAM

TECHNICAL FIELD

The present invention relates to a record/play device, a simultaneous record/play control method, and a simultaneous record/play control program. However, use of the invention is not limited to the record/play device, the simultaneous record/play control method, and the simultaneous record/play control program.

BACKGROUND ART

Conventionally record/play device capable of increasing the degree of multiplexing data without losing audio data and reducing the response time when starting playback are disclosed. The record/play device is capable of transferring audio packets to a hard disk to store the audio packets, and of receiving the audio packets stored in the hard disk to playback an original analog audio signal. The record/play device includes a file transfer buffer with two buffer areas, each having a capacity capable of accumulating the predetermined number of audio packets, and a managing unit that controls writing/reading of audio packets to/from the file transfer buffer. The managing unit switches the operation of each buffer area between writing and reading based on the number of audio packets stored in one of the buffer areas (see, for example, Patent Document 1 below).

Patent Document 1: Japanese Patent Laid-Open Publication No. 2003-308643

DISCLOSURE OF INVENTION

Problem to be Solved by the Invention

However, when performing so-called simultaneous record and play in which playback is performed while recording audio data, it is necessary to keep a certain amount of data in the hard disk before starting playback, so as not to cause breaks in playback.

Therefore, the conventional technique has a problem, for example, in that because of the amount of data kept for starting the playback in the simultaneous record and play, a time delay occurs between the start of recording and the start of playback during recording, and the user has to wait certain delay time before the playback is started.

Moreover, in the conventional technique, it is necessary to monitor whether a sufficient amount of data enabling the simultaneous record and play is stored, and therefore, the load on the record/play device is increased, resulting in a delay in starting the playback in the simultaneous record and play.

As describe, when performing the simultaneous record and play, if the start of playback is delayed, the user is misunderstand that he/she has performed an erroneous operation or that the device is malfunctioning, and the user has to redo the operation for the simultaneous record and play. Thus, the operation becomes burdensome.

Means for Solving Problem

A record/play device according to the invention of claim 1 includes a recording processor that records a series of content data sequentially input to a recording medium; a changing unit that changes, during a record process by the recording processor, a data size of content data that is to be recorded to the recording medium to a data size different from a data size at a time of recording of content data that has been recorded on the recording medium; a playback processor that plays back, during the recording process by the recording processor, the content data recorded on the recording medium; a recording start input unit that accepts an input to start recording by the recording processor; a setting unit that sets, when the recording start input unit accepts the input to start recording, the data size of the content data that is to be recorded on the recording medium to a predetermined data size; and a detector that detects number of records of content data recorded on the recording medium at the predetermined data size set by the setting unit.

When the number of records detected by the detector has reached a predetermined number, the playback processor starts reproducing the content data recorded on the recording medium during the recording process by the recording processor, and when playback is started by the playback processor, the changing unit changes the data size of the content data that is to be recorded to the recording medium to a data size larger than the predetermined data size set by the setting unit.

Moreover, a simultaneous record/play control method according to the invention of claim 6 is for is for a record/play device that plays back content data recorded on a recording medium during recording, on the recording medium, a series of content data sequentially input, and includes a recording start input step of inputting a start to record the string of content data; a setting step of setting, when the start to record is input at the recording start input step, a data size to record content data to a predetermined data size; a detecting step of detecting number of records of content data recorded on the recording medium at the predetermined data size; a playback start instructing step of instructing to start, when the number of records detected at the detecting step has reached a predetermined number, playback of the content data recorded on the recording medium; and a changing step of changing, when the number of records detected at the detecting step, the data size to record content data to a data size larger than the data size set at the setting step.

A simultaneous record/play control program causes a computer to execute a simultaneous record/play control method.

BRIEF DESCRIPTION OF DRAWINGS

FIG. 3 is a flowchart of a recording process according to examples;

FIG. 4 is a flowchart of a playback process according to examples; and

FIG. 5 is a flowchart of a simultaneous record/play control process according to examples.

Figure 1:
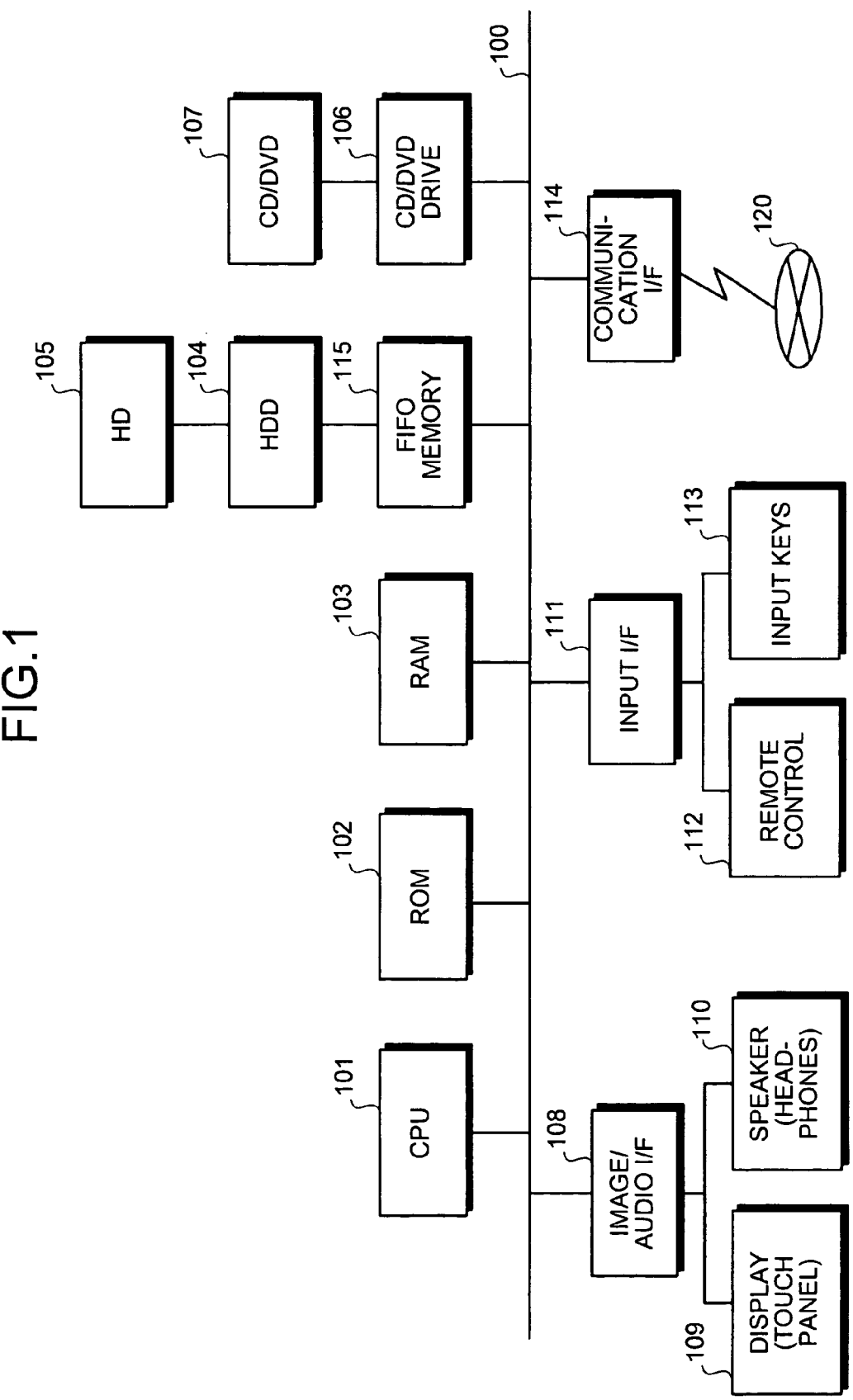
FIG. 1 is a block diagram of a hardware configuration of a record/play device according to an embodiment of the present invention.

EXPLANATIONS OF LETTERS OR NUMERALS 200 record/play device
201 recording processor
202 recorder
203 playback processor
204 controller
220 recording medium 240 operation input unit
241 bit rate transmitter
243 data size setting unit
245 frequency detector
246 playback start signal transmitter
247 data size changing unit

BEST MODE(S) FOR CARRYING OUT THE INVENTION

Embodiments

Exemplary embodiments of the record/play device, the simultaneous record/play control method, and the simultaneous record/play control program according to the present invention will be described in detail with reference to the accompanying drawings. The record/play device, the simultaneous record/play control method, and the simultaneous record/play control program realize simultaneous record and play of a series of content data.

Here, the content data is electronic data of image or audio, and examples thereof include commercially available image content such as movies, live music footage, and documentaries, image information such as television program recordings, images shot by a video camera, and map data to be displayed in a navigation apparatus, image content in JPG and BMP, image representations of data content for a component analysis, song information representing a song and other audio information such as conversational content and sound effects.

(Hardware Configuration of the Record/Play Device)

First, a hardware configuration of a record/play device according to an embodiment of the present invention is described. FIG. 1 is a block diagram of the hardware configuration of the record/play device according to the embodiment of the present invention. As shown in FIG. 1, the record/play device includes a CPU 101, a ROM 102, a RAM 103, an HDD (hard disk drive) 104, an HD (hard disk) 105, a CD/DVD drive 106, a CD/DVD 107 as an example of a removable recording medium, an image/audio I/F (interface) 108, a display 109, speaker 110, an input I/F (interface) 111, a remote control 112, input keys (including a keyboard and a mouse) 113, a communication I/F (interface) 114, and a FIFO memory 115. The components 101 to 115 are connected to one another via a bus 100.

The CPU 101 is responsible for controlling the entire record/play device. The ROM 102 has stored therein a program such as a boot program. The RAM 103 is used as a work area of the CPU 101. The HDD 104 controls reading/writing of data to/from the HD 105 under control of the CPU 101. The HD 105 stores data written under control of the HDD 104.

The CD/DVD drive 106 controls reading/writing of data to/from the CD/DVD 107 under control of the CPU 101. The CD/DVD 107 is a removable recording medium from which recorded data is read under control of the CD/DVD drive 106. A writable recording medium can be used as the CD/DVD 107. In addition to the CD/DVD 107, a CD-ROM (a CD-R or a CD-RW), an MO, and a memory card may be used as the removable recording medium.

The image/audio I/F (interface) 108 is connected to the display 109 for image display and the speaker 110 (or headphones) for audio output. The display 109 displays a cursor, icons, a menu, windows, and a toolbox as well as various data such as characters and images. For example, a CRT, a TFT liquid crystal display, and a plasma display can be employed as the display 109. The speaker 110 output audio.

The input I/F 111 inputs data transmitted from the remote control 112, which is provided with a plurality of keys for inputting characters, numerical values, various commands, etc., and the input keys (including a keyboard and a mouse) 113. The input keys (including a keyboard and a mouse) 113 include keys for inputting characters, numbers, various commands, etc., and input data according to the user's operation.

The communication I/F 114 is connected to a network 120, such as the Internet, by radio or by a communication line, and to other apparatuses via the network 120. The communication I/F 114 serves as an interface between the network 120 and the CPU 101, and controls input/output of data to/from external devices. Examples of the network 120 include a LAN, a WAN, a public line network, and a cellular phone network.

The FIFO memory 115 stores data read from the CD/DVD 107 by the CD/DVD drive 106 in an order of reading, and when the stored data is to be retrieved to be used, the FIFO memory 115 outputs the data from the oldest piece of data in an order of storing. Moreover, the FIFO memory 115 stores data received through the communication I/F 114 in an order of receiving, and when the stored data is to be retrieved to be used, the FIFO memory 115 outputs the data from the oldest piece of data in order of storing. Furthermore, the FIFO memory 115 stores data read from the HD 105 by the HDD 104 in an order of reading, and when the stored data is to be retrieved to be used, the FIFO memory 115 outputs the data to the image/audio I/F 108 from the oldest piece of data in order of storing.

(Functional Configuration of the Record/Play Device)

Figure 2:
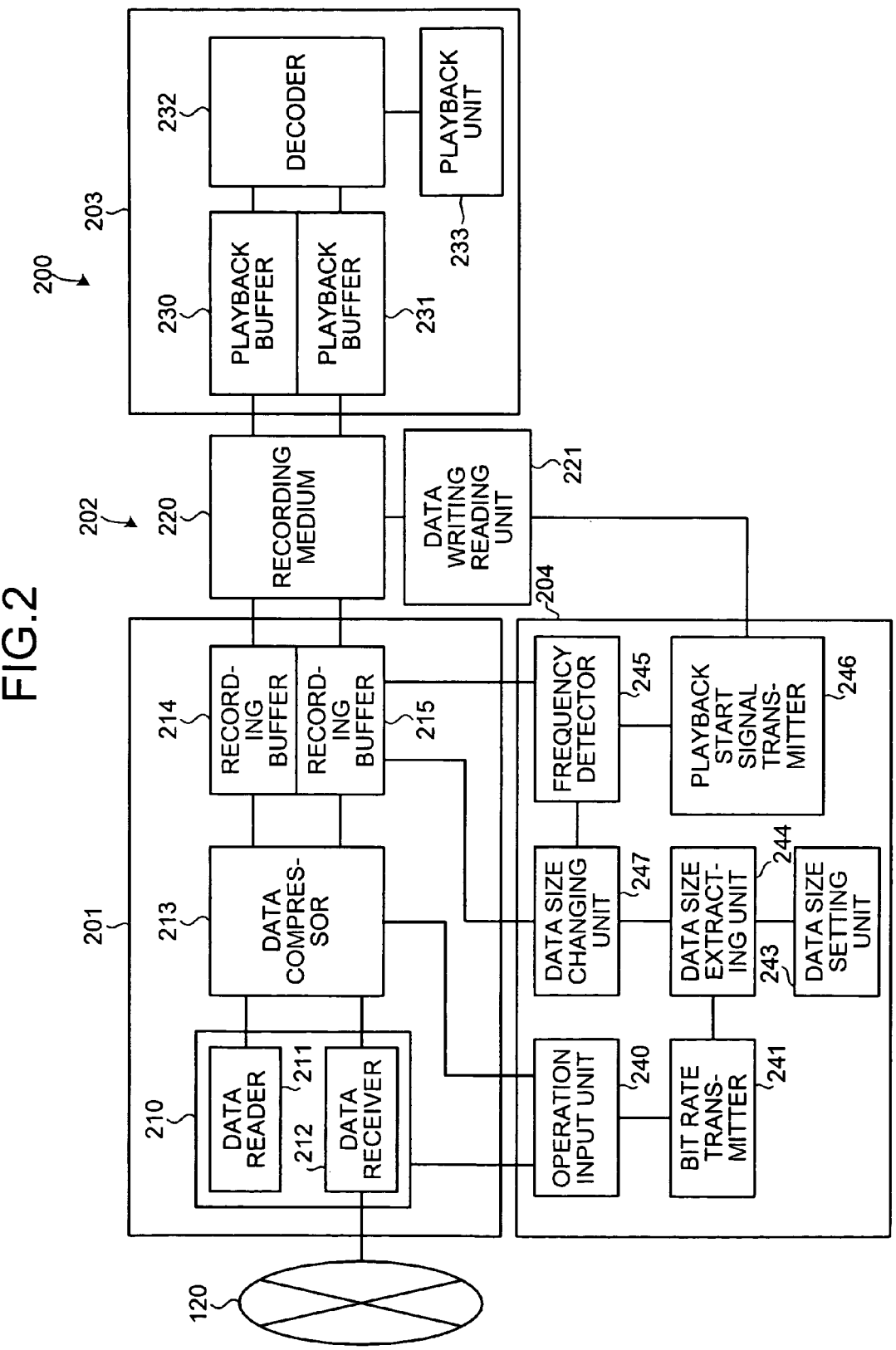
FIG. 2 is a block diagram of a functional configuration of the record/play device according to the embodiment of the present invention.

Next, the functional configuration of the record/play device according to the embodiment of the present invention is explained. FIG. 2 is a block diagram of the functional configuration of the record/play device according to the embodiment of the present invention. As shown in FIG. 2, the record/play device 200 includes a recording processor 201, a recorder 202, a playback processor 203, and a controller 204.

The recording processor 201 includes a data input unit 210, a data compressor 213, and recording buffers 214 and 215. When a signal to start simultaneous record and play is input by an operation input unit 240, which will be described later, the data input unit 210 sequentially inputs content data from the exterior. The data input unit 210 includes a data reader 211 and a data receiver 212. The data reader 211 reads content data from the CD/DVD 107 having content data recorded therein, and inputs the content data into the record/play device 200.

The data receiver 212 receives content data from the network 120, and inputs the content data into the record/play device 200. The data reader 211 has a function implemented by the CD/DVD drive 106 shown in FIG. 1. The data receiver 212 has a function implemented by the communication I/F 114 shown in FIG. 1.

The data compressor 213 compresses content data, which is sequentially input from the data input unit 210, at a preset default bit rate. The data compression method is in conformity with a well-known standard such as MPEG. Specifically, the function of the data compressor 213 is implemented by the CPU 101 executing a program stored in a recording medium, e.g., the ROM 102, the RAM 103, the HD 105, or the CD/DVD 107 shown in FIG. 1.

The recording buffers 214 and 215 hold pieces of compressed data compressed by the data compressor 213, and transfer them to a recording medium 220 in order of holding. Concretely, the recording buffers 214 and 215 record the compressed data in a time-division manner. When compressed data accumulated in the recording buffer 214 (or 215)

is being written to the recording medium 220, the other recording buffer 215 (or 214) in available state accumulates compressed data.

In normal state, the recording buffers 214 and 215 transfer the compressed data to the recording medium 220 in a predetermined transfer data amount (data size). When the transfer data amount is changed by a data size changing unit 247, which will be described later, the compressed data is transferred to the recording medium 220 in a transfer data amount (data size) sufficient not to cause an audio break during playback. Specifically, the function of the recording buffers 214 and 215 is implemented by, for example, the FIFO memory 115 shown in FIG. 1.

The recorder 202 includes the recording medium 220, and a data writing/reading unit 221. The recording medium 220 records compressed data transferred from the recording buffers. Specifically, the function of the recording medium 220 is implemented by, for example, the RAM 103 or the HD 105 shown in FIG. 1.

The data writing/reading unit 221 writes the compressed data transferred from the recording buffers 214 and 215 to the recording medium 220. When a playback start signal is received from a playback start signal transmitter 246, which will be described later, it starts reading the compressed data recorded on the recording medium 220, and writes to a playback buffer 230 and 231. Specifically, the function of the data writing/reading unit 221 is implemented by, for example, the HDD 104 shown in FIG. 1.

The playback processor 203 includes the playback buffers 230 and 231, a decoder 232, and a playback unit 233. The compressed data recorded on the recording medium 220 is written to the playback buffers from which the data is transferred to the decoder 232 in order of recording. Specifically, the playback buffers 230 and 231 transfer the compressed data in a time-division manner. When compressed data accumulated in the playback buffer 230 (or 231) is being transferred to the decoder 232, compressed data from the recording medium 220 is written to the other playback buffer 231 (or 230) in available state. Specifically, the function of the playback buffers 230 and 231 is implemented by, for example, the FIFO memory 115 shown in FIG. 1.

The decoder 232 decodes the compressed data transferred from the playback buffers 230 and 231. The decoding method is in conformity with a well-known standard such as MPEG. Concretely, the decoder 232 has a function implemented by the CPU 101 executing a program stored in a recording medium, e.g., the ROM 102, the RAM 103, the HD 105, or the CD/DVD 107 shown in FIG. 1.

The playback unit 233 plays back content data decoded by the decoder 232. Concretely, when the content data is audio content data, a song therein is output. In addition, when the content data is video content data, video is displayed. Concretely, the playback unit 233 has a function implemented by, for example, the image/audio I/F 108, the display 109, or the speaker 110 shown in FIG. 1.

The controller 204 controls simultaneous recording and playback of content data recorded on the recording medium 220 during recording of a series of content data sequentially input on the recording medium 220. The controller 204 includes the operation input unit 240, a bit rate transmitter 241, a data size setting unit 243, a data size extracting unit 244, a frequency detector 245, the playback start signal transmitter 246, and the data size changing unit 247.

The operation input unit 240 receives an input of a signal to start simultaneous record and play and an input to change the bit rate that are made by a user operating the remote control 112 or the input key 113 shown in FIG. 1. The function of the operation input unit 240 is implemented by the input I/F 111 shown in FIG. 1.

The bit rate transmitter 241 transmits to the data size extracting unit 244 a preset default bit rate or a bit rate obtained by the operation input unit 240 accepting the input to change. Specifically, the function of the bit rate transmitter 241 is implemented by the CPU 101 executing a program stored in a recording medium, e.g., the ROM 102, the RAM 103, the HD 105, or the CD/DVD 107 shown in FIG. 1.

The data size setting unit 243 contains a data size corresponding to the bit rate transmitted from the bit rate transmitter 241. Here, the data size setting unit 243 is described specifically.

The size of data compressed at a default bit rate A is taken as a data size B. The data compression requires a compression time C. The time taken for writing the compressed data to the recording medium 220 and the time taken for reading the written compressed data are both taken as a time D. The time D is a roughly constant value, which does not depend on the amount of compressed data.

The time taken for decoding and reproducing compressed data having the data size B is taken as a playback time F. If the next compressed data (the second time) is prepared, no audio breaks occur. Accordingly, if a conditional equation below is satisfied, the data size B is a minimum possible data size that causes no audio breaks at the time of playback. The data size setting unit 243 is set so as to satisfy the following conditional equation (1).

$$F - 2C - D > 0 \tag{1}$$

Specifically, the function of the data size setting unit 243 is implemented by a recording medium, e.g., the ROM 102, the RAM 103, the HD 105, or the CD/DVD 107 shown in FIG. 1.

The data size extracting unit 244 extracts from the data size setting unit 243 the data size corresponding to the bit rate transmitted from the bit rate transmitter 241. Concretely, the data size extracting unit 244 has a function implemented by the CPU 101 executing a program stored in a recording medium, e.g., the ROM 102, the RAM 103, the HD 105, or the CD/DVD 107 shown in FIG. 1.

The frequency detector 245 counts the number of writes of compressed data compressed by the data compressor 213, and detects whether the counted number of writes has reached a predetermined number n. Concretely, the predetermined number n is set such that a data amount obtained by multiplying the predetermined number n by the data size is a data amount sufficient to cause no breaks in playback in the playback processor 203. Specifically, the function of the frequency detector 245 is implemented by the CPU 101 executing a program stored in a recording medium, e.g., the ROM 102, the RAM 103, the HD 105, or the CD/DVD 107 shown in FIG. 1.

When the frequency detector 245 detects that the counted number of writes has reached the predetermined number n, the playback start signal transmitter 246 transmits a playback start signal to the data writing/reading unit 221. Specifically, the function of the playback start signal transmitter 246 is implemented by the CPU 101 executing a program stored in a recording medium, e.g., the ROM 102, the RAM 103, the HD 105, or the CD/DVD 107 shown in FIG. 1.

When the frequency detector 245 detects that the counted number of writes has reached the predetermined number n, the data size changing unit 247 changes the data size of the compressed data that is to be written from the recording buffer 214, 215 to the recording medium 220 to the data size extracted by the data size extracting unit 244. Specifically, the function of the data size changing unit 247 is implemented by the CPU 101 executing a program stored in a recording medium, e.g., the ROM 102, the RAM 103, the HD 105, or the CD/DVD 107 shown in FIG. 1.

EXAMPLES

Next, a recording process procedure according to examples is explained. FIG. 3 is a flowchart of the recording process according to the examples. As shown in FIG. 3, when an input to instruct start if simultaneous record and play is received (step S301: YES), a series of content data is sequentially input (step S302). When no input to instruct a change of the bit rate is received (step S303: NO), a compression process is performed at a default bit rate (step S304). On the other hand, when an input to instruct a change of the bit rate is received (step S303: YES), the compression process is performed at the changed bit rate (step S305).

Thereafter, compressed data is written to the recording buffer 214, 215 (step S306), and then transferred and recorded to the recording medium 220 (step S307). When content data is present (step S308: YES), the process proceeds to step S302. On the other hand, if no content data is present (step S308: NO), the recording process ends.

Next, a playback process according to the examples is explained. FIG. 4 is a flowchart of the playback process according to the examples. First, when a playback start signal is received (step S401: YES), compressed data is read from the recording medium 220, and written to the playback buffer 230, 231 (step S402). Then, compressed data sequentially transferred from the playback buffer 230, 231 is decoded (step S403).

The decoded content data is reproduced (step S404). When compressed data is present in the recording medium 220 (step S405: YES), the procedure proceeds to step S402. On the other hand, when no compressed data is present in the recording medium 220 (step S405: NO), the playback process ends.

Next, a simultaneous recording/play control process according to the examples is explained. FIG. 5 is a flowchart of the simultaneous recording/play control process according to the examples. First, when an input to instruct start of simultaneous record and play is received (step S501: YES), a default bit rate is transmitted (step S502). The processing in step S501 is the same as the processing at step S301 shown in FIG. 3.

A data size corresponding to the bit rate is extracted from the data size setting unit 243 (step S503), and the data size of compressed data that is to be recorded to the recording medium 220 is changed to the extracted data size (step S504). As a result, the amount of data that is to be transferred from the recording buffer 214, 215 is changed.

When the number of writes to the recording medium 220 has reached n (step S505: YES), the number of writes is reset to "0" (step S506). A playback start signal is transmitted to the data writing/reading unit 221 (step S507), and the data size of the compressed data that is to be recorded on the recording medium 220 is changed to the default data size (step S508).

When an input to change the bit rate occurs (step S509: YES), the changed bit rate is transmitted (step S510), and the procedure proceeds to step S503. On the other hand, when no input to instruct change of the bit rate is received (step S509: NO), if the recording process is not completed (step S511: NO), the process proceeds to step S509. When the recording process is completed (step S511: YES), the simultaneous record/play control process ends.

As such, at the start of playback, the data size of data that is to be written on the recording medium 220 is reduced to a smaller size than the default data size and accumulating a reproducible amount of data in the recording medium 220, and the playback processor 203 starts the playback after enough amount of data to enable the playback is accumulated in the recording medium 220, thereby quickly starting the playback process without causing breaks in playback. In addition, the data size is reset to the default after starting the playback process, thereby decreasing frequency of writing. As a result, the performance of the record/play device 200 is improved.

In addition, during the recording and playback, when the user inputs a change of the bit rate, data that is to be written to the recording medium 220 is written after reducing the data size to a less size than the default data size in accordance with the changed bit rate, thereby quickly starting the playback process without causing breaks in playback.

As described above, with to the record/play device, the simultaneous record/play control method, and the simultaneous record/play control program according to the embodiment, the frequency of writing content data to the recording medium is increased by reducing the data size before starting the playback, so that it is possible to speedily accumulate a reproducible amount of data, thereby achieving quick start of playback during the simultaneous record and play.

As a result, the user can view content data reproduced simultaneously with recording of the content data, and therefore, it is possible to prevent misunderstanding that that he/she has performed an erroneous operation or that the apparatus is malfunctioning. Accordingly, it is possible to view the content data without feeling irritated, while waiting for playback to start. In addition, after the start of playback, the frequency of writing is decreased by increasing the data size, thereby improving simultaneous record and play performance of the record/play device.

The simultaneous record/play control method described in the embodiments can be realized by executing a program prepared in advance on a computer such as a personal computer and a workstation. The program is recorded on a computer-readable recording medium 220, such as a hard disk, a flexible disk, a CD-ROM, an MO, or a DVD, and executed when read from the recording medium 220 by the computer. The program may be a transmission medium that can be distributed through a network such as the Internet.

The record/play device 200 according to the embodiments is applicable to, for example, CD players, MD players, MD recorders, DVD players, DVD recorders, players using data compressed in MP3 or WMA, and car navigation apparatuses. The record/play device 200 can also be used as, for example, audio-visual equipment (for household, business, automobile, or portable use). Other applicable examples include network-type audio-visual distributors/receivers (server-client systems), real-time analytical result output devices, TTS (Text To Speech) audio synthesizers, automatic translation devices, and component analytical result display devices.

The invention claimed is:
1. A record/play device comprising:
   a recording unit configured to record, on a recording medium, a series of data sequentially being input to the record/play device;
   a changing unit configured to change, while recording the data by the recording unit, a size at which the data is to be recorded on the recording medium to a different size from a size at which data has been recorded on the recording medium;

a playback unit configured to play back, while recording the data by the recording unit, the data recorded by the recording unit;

a record-instruction receiving unit configured to receive record-instruction for the recording unit to start recording;

a setting unit configured to set to a predetermined size, when the record instruction is received, the size of the data at which the data is to be recorded; and a detecting unit configured to detect number of times of recording data at the predetermined size, wherein the playback unit is configured to start playing back the data recorded by the recording unit when the number reaches a predeteimined number, and the changing unit is configured to change the size at which the data is to be recorded to a larger size than the predetermined size, upon the playback unit starting to play back.

2. The record/play device according to claim 1, wherein the changing unit is configured to change, while recording the data by the recording unit, the size at which the data is to be recorded to a larger size than the size at which the data has been recorded on the recording medium.

3. The record/play device according to claim 1, wherein the changing unit is configured to change, while recording the data by the recording unit, the size of the data at which the data is to be recorded to a smaller size than the size at which the data has been recorded on the recording medium.

4. The record/play device according to claim 1, further comprising a change-instruction receiving unit configured to receive, while recording the data by the recording unit, change instruction to change the size of the data at which the data is to be recorded, wherein the changing unit is configured to change the size of the data at which the data is to be recorded based on the change-instruction.

5. A simultaneous record/play control method for a record/play device that plays back data recorded on a recording medium while recording, on the recording medium, a series of data sequentially being input, the simultaneous record/play control method comprising:

instructing start of recording the data;

setting, when the start is instructed at the instructing, a size at which the data is to be recorded to a predetermined size;

detecting number of times of recording the data at the predetermined size;

instructing start of playing back the data recorded on the recording medium, when the number reaches a predetermined number; and changing the size at which the data is to be recorded to a larger size than the predetermined size when the number reaches a predetermined number.

6. The simultaneous record/play control method according to claim 5, further comprising changing the size at which the data is to be recorded, from the larger size to a size smaller than the larger size.

7. A non-transitory computer-readable recording medium that stores a computer program for realizing a simultaneous record/play control method on a computer, the computer program making a computer execute:

instructing start of recording data;

setting, when the start is instructed at the instructing, a size at which the data is to be recorded to a predetermined size;

detecting number of times of recording the data at the predetermined size;

instructing start of playing back the data recorded on the recording medium, when the number reaches a predetermined number; and changing the size at which the data is to be recorded to a larger size than the predetermined size when the number reaches a predetermined number.

8. The non-transitory computer-readable recording medium according to claim 7, wherein the computer program further makes the computer execute changing the size at which the data is to be recorded, from the larger size to a size smaller than the larger size.

* * * * *